May 12, 1964 L. I. PICKERT 3,132,902
FLUID PRESSURE BRAKE APPARATUS
Filed Aug. 8, 1962
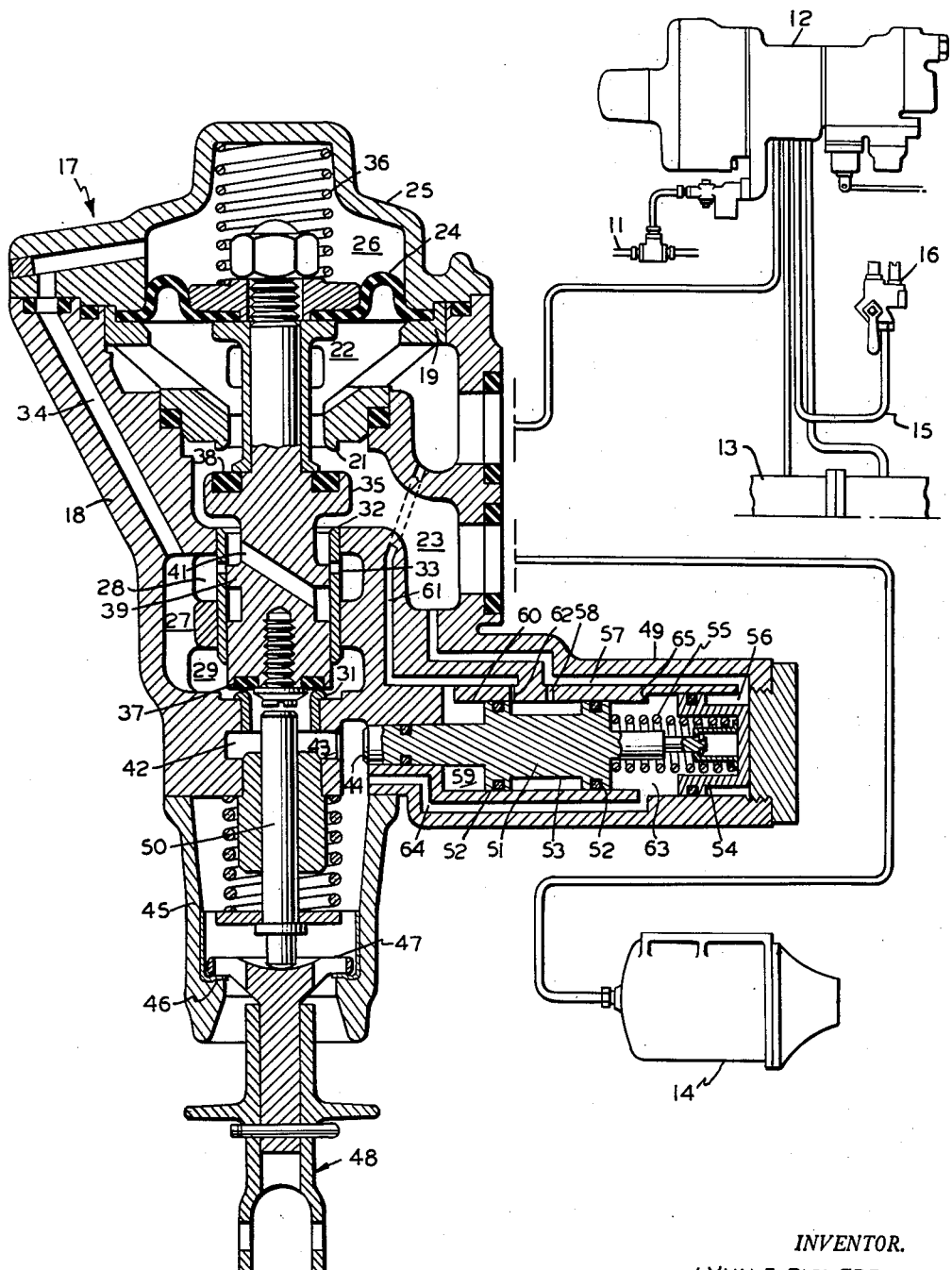
INVENTOR.
LYNN I. PICKERT
BY Dodge and Son
ATTORNEYS United States Patent Office 3,132,902
Patented May 12, 1964

3,132,902
FLUID PRESSURE BRAKE APPARATUS
Lynn I. Pickert, Watertown, N.Y., assignor to The New York Air Brake Company, a corporation of New Jersey
Filed Aug. 8, 1962, Ser. No. 215,727
3 Claims. (Cl. 303—69)

This invention relates to fluid pressure brake means. More specifically, it relates to an improved brake cylinder release valve.

The Pickert Patent No. 2,392,185, assigned to applicant's assignee, discloses and claims a brake cylinder release valve of the type adapted for interposition between the control valve and the brake cylinder of a conventional fluid pressure operated brake controlling system. In that release valve, there is a double-beat poppet valve which is shiftable between a normal position in which it permits free flow between the control pipe and the brake cylinder through the release valve, and a release position in which such flow through the valve is terminated and the brake cylinder is vented. A fluid pressure motor is provided which will retain the double-beat poppet valve in its release position, so long as pressure is maintained in the control pipe.

It is conventional practice in the operation of freight trains to provide a retainer valve in the brake cylinder exhaust connection which may be shifted between a position in which it permits the brake cylinder to be vented completely and a position in which it will retain within the brake cylinder a predetermined pressure. Such retainer valves are normally set in the pressure-retaining position during downhill operation of the train. If the release valve shown in the Pickert patent is moved to release position to vent pressure from the brake cylinder of a car on which the retainer valve is set in pressure-retaining position, the release valve cannot rest to its normal position when the control valve moves to release position because the pressure in the control pipe chamber will reduce only to that value which the retainer valve is set to retain. It will be seen that it would be possible to operate the release valve in such a way that all of those brake cylinders on which the retainer valve was set to retain pressure, would be disabled. Such a condition is potentially dangerous. Various solutions to this problem have been proposed in the past, and it is to the solution of this problem that the present invention is directed.

According to the invention, a secondary vent valve is provided in series flow relation with the vent valve of the brake cylinder release valve. This secondary vent valve is first closed by the development of pressure in the brake cylinder chamber and the control pipe chamber, and then opened when control pipe pressure rises above a predetermined value. This pre-determined value is selected with regard to the maximum pressure setting of the retainer valve and is slightly higher than this maximum pressure setting. If the main valve of the brake cylinder release valve is shifted to release position when the secondary vent valve is closed the brake cylinder will not be vented and also the motor means will not be rendered effective to hold the main valve means in release position. Thus, the main valve will return to normal position when the valve actuator is released. If the pressure in the brake cylinder is above the predetermined value when the main valve is moved to release position, the brake cylinder will be vented and also the motor means will be rendered effective to hold the main valve in release position. The brake cylinder release valve will reset when the control valve returns to release position, because the control pipe will be vented through the exhaust pipe of the control valve and through a secondary exhaust connection provided in the open position of the secondary vent valve.

In the preferred form, the actuator for the secondary vent valve comprises a first piston, subject to control pipe pressure and urging the secondary vent valve open, and a second motor piston subject to brake cylinder pressure and urging the secondary vent valve in its closing direction, and a spring reacting between said motor pistons. Stops are provided to limit the movement of both pistons in the valve closing direction. The stops being so arranged that the first motor piston reaches the limit of its motion before the second piston reaches the limit of its motion.

The preferred embodiment of the invention will be described with reference to the accompanying drawing in which the brake cylinder release valve is shown in axial section and the remainder of the fluid pressure brake controlling equipment for a single car is shown diagrammatically on a smaller scale.

The fluid pressure brake controlling equipment for a single freight car is shown and includes a brake pipe 11, a control valve 12 (the standard AB triple valve is shown), a supply reservoir 13 (the standard dual reservoir including auxiliary and emergency reservoir portions, as required by the AB triple valve, is shown), a brake cylinder 14, a release pipe 15, and a retainer valve 16. The retainer valve 16 limits the value to which pressure may be reduced in the brake cylinder 14 when control valve 12 is in release position. Retainer valve 16 customarily has a number of settings to which it is manually shiftable. In at least one setting, the release pipe may be vented. In a second setting, a maximum pressure of say 20 p.s.i. is retained in the brake cylinder even though the control valve 12 is in release position.

The present invention is concerned with an improved brake cylinder release valve shown at 17. The release valve includes a main housing casting 18, cored as shown to receive valve seat insert 19 which carries on its lower face a valve seat 21. This valve seat lies between a control pipe chamber 22 and a brake cylinder chamber 23. The upper side of the control pipe chamber 22 is closed by slack flexible diaphragm 24. Diaphragm 24 is clamped in place at its outer periphery by a cap 25 secured to housing 18. A motor chamber 26 is formed in cap 25 above the diaphragm 24.

A vent valve chamber 27 is formed in lower portion of housing 18 and includes upper and lower annular chambers 28 and 29. A vent valve seat 31 is pressed into housing 18 beneath the vent valve chamber 27. A guide bushing 32 is pressed into the housing as shown and includes radial ports 33. A passage 34 extends from the vent valve chamber 27 to the motor chamber 26.

Flow through the release valve 17 is controlled by a double-beat poppet valve 35. Valve 35 includes an axial stem by which it is secured to the diaphragm 24 as shown. The valve 35 and diaphragm 24 are biased toward the illustrated normal position by a light spring 36. A downward presented valve face 37 is formed on the lower end of valve 35, and an upward presented valve face 38 is carried at its upper end. As shown, the main valve 35 has reduced diameter portions separated by a land 39. A metering port 41 extends diagonally through valve 35 between the reduced diameter portions.

The portions of the release valve described in the preceding three paragraphs are known in the art and shown in prior patents such as the Klein Patent No. 2,444,993.

According to the present invention, the housing 18 is provided at its lower end with a portion in which is formed a secondary vent chamber 42 having a laterally extending exhaust port 43 controlled by the end of valve plunger 44. Fastened to the lower face of the valve body 18, is an extension 45 provided at its lower edge with an inturned flange 46 on which the ported, universally tilting head 47 of the actuator assembly 48 is seated. A push rod 50, guided in a bushing pressed into the housing, is spring-biased into contact with the head 47 of the actuating assembly 48.

The body 18 is provided with a lateral extension 49. Formed in the extension 49 is a bore 60 in which the valve actuating piston 51 is reciprocable. This piston 51 includes end lands 52 separated by an encircling groove 53. As shown, the bore in which the piston 51 is reciprocable is counterbored and the counterbore receives a combined piston and spring seat 54. The effective area of piston 51 is smaller than that of piston 54. A spring 55 reacts between the piston 51 and the combined piston and spring seat 54. In the illustrated position of the release valve, spring 55 is preloaded because the cup-like spring seat is held captive on the tail rod of the piston 51 by means of a snap ring as shown in the drawings. The shoulder 65 formed at the junction of the bore 60 and the counterbore therein serves as a stop to limit the movement of the combined piston and spring seat 54 toward piston 51. A tail rod on piston 51 maintains a minimum interval between pistons 51 and 54. The working space 56 in the outer end of the counterbore is connected by a passage 57 with the brake cylinder chamber 23. Side port 58 extends from the passage 57 and communicates with the chamber formed by the groove 53 and the end lands 52. The working space 59 between the inner end of the bore 60 and the piston 51 is connected through a passage 61 with the control pipe chamber 22. This passage 61 also affords communication to the side port 62 which in the illustrated position affords communication between passage 61 and the chamber defined by the groove 53 and end lands 52. The space 63 between the piston 51 and the combined piston and spring seat 54 is connected to atmosphere by passage 64.

Operation

In the drawing, the parts are shown in the positions they would assume when the control valve 12 is in release position. The brakes are applied by manipulation of an engineer's brake valve (not shown). The pressure developed in the brake cylinder during a brake application may be controlled. When an application is made, equal pressures will develop in the brake cylinder 14, chambers 22, 23 and 27, and in the motor working space 26. This pressure will also be present in motor working spaces 56 and 59. In describing the operation of the release valve, it will be assumed first that the retainer valve 16 is in the position in which it permits complete venting of the brake cylinder when the control valve 12 is in release position. The brake cylinder pressure developed during a brake application, so long as it does not exceed a predetermined value slightly higher than the maximum pressure which the retainer valve may be set to retain, will cause piston 54 to move into the counterbore in bore 60 and seat on shoulder 65. Simultaneously, piston 51 will have been moved into bore 60 and valve plunger 44 will close the vent passage 43. If the brake cylinder pressure builds up beyond the maximum retainer valve setting, piston 54 will remain stationary but piston 51 will move to the right compressing spring 55. The tail rod on piston 51 will limit this motion so that side port 62 is not overtravelled by piston 51. The vent passage 43 will now be open.

If brakes are applied with a pressure higher than the maximum retainer valve setting, actuation of the release valve 17 will cause the brake cylinder to be vented in the normal manner. When the brake cylinder release valve 17 is in release position, valve face 38 engages the valve seat 21 and cuts off communication between control pipe chamber 22 and the brake cylinder chamber 23. In this position, pressure is released from the brake cylinder and from working space 56. Therefore, the pressure which is held in working space 60 and in the control pipe chamber 22 will cause the pistons 51 and 54 to move to the right and spring 55 will be compressed to a degree sufficient to blank the side port 62 so that no air is vented from the control pipe through this side port when the release valve is in release position. The pressure in the control pipe chamber 22 will hold the main valve of the brake cylinder release valve in release position until the control valve 12 releases pressure from chamber 22. When this pressure is released, the brake cylinder release valve will reset and return to its normal position in the usual manner.

If the retainer valve 16 is set in a pressure retaining position, the restoration of the main valve of the brake cylinder release valve to normal position occurs in a slightly different manner. When the pressure in the control pipe 22 has been reduced by flow through the control valve 12 and the retainer valve 16 to the pressure setting of the retainer valve, the pressure in working chamber 59 will have been sufficiently reduced so that spring 55 will have returned piston 51 to the left sufficiently far to reestablish communication between the control pipe chamber 22 and the brake cylinder chamber 23 through the ports 61, 62, groove 53 and ports 58 and 57. Hence, even though the set retainer valve will prevent complete venting of the control pipe chamber 22 through the control valve 12, this venting is completed through the communication established between the brake cylinder chamber and the control pipe chamber in the release position of the release valve.

If a brake application is made which creates in the brake cylinder 14 a pressure less than the maximum pressure which the retainer 16 can retain, the secondary vent passage 43 will be closed by the valve plunger 44. As in the case of any application, equal pressures are developed in chambers 22 and 23 and in the associated working spaces 56 and 59. Because of the larger effective area of piston 54, as contrasted to that of piston 51, piston 54 will move to the left carrying with it the piston 51. This motion will continue until valve plunger 44 seats to close the passage 43. The counteracting pressures in the spaces 59 and 56 being ineffective to compress the spring 55. If, under these circumstances, it is attempted to actuate the brake cylinder release valve 17, it will be impossible to vent fluid from the motor working space 26 and the chamber 23 because the secondary vent valve is closed and prevents the escape of any pressure fluid. Therefore, as soon as the actuator is released, the main valve will be returned to its normal position by the spring 36. It will be seen therefore that the release valve cannot be actuated to release pressure from the brake cylinder unless a pressure higher than the predetermined value is present in both the brake cylinder chamber 23 and the control pipe chamber 22.

If the control valve 12 is in release position and pressure fluid is retained in the brake cylinder 14, the secondary vent valve will be closed by this pressure and it will be impossible to operate the brake cylinder release valve 17 so as to release this pressure.

While the preferred embodiment of the invention has been described in considerable detail, it will be understood that appended claims afford the proper measure of the scope of the invention.

What is claimed is:

1. In a brake cylinder release valve, for interposition between the control valve and the brake cylinder of a fluid pressure brake controlling system, of the type including a valve housing having therein a control pipe chamber, for connection with the control pipe of the control valve, a brake cylinder chamber, for connection with the brake cylinder, and a vent valve chamber, an exhaust passage, main valve means yieldingly biased toward a normal position in which the three chambers are in flow communication with one another and isolated from the exhaust passage, and shiftable to a release position in which the control pipe chamber is isolated from the other chambers and the exhaust passage is placed in communication with the brake cylinder chamber and the vent valve chamber, fluid pressure operated means effective to move the main valve means to release position when control pipe chamber pressure exceeds vent valve chamber pressure, and manually operable means to shift the main valve means toward release position and thus restrict communication between the control pipe chamber and the brake cylinder chamber and establish communication between brake cylinder chamber and the exhaust passage, the improvement which comprises:

(a) a secondary vent valve in the exhaust passage;
(b) means effective to close the secondary vent valve when the main valve is in normal position and control pipe pressure is less than a predetermined value, and effective when control pipe pressure exceeds the predetermined value, to open the secondary vent valve;
(c) a bypass passage affording flow from the control pipe chamber to the brake cylinder chamber; and
(d) valve means controlling flow through the passage and effective to open the passage when control pipe pressure is less than the predetermined value, but greater than brake cylinder pressure, and effective to close the passage when the pressure in the control pipe exceeds both the predetermined pressure and the brake cylinder pressure.

2. In a brake cylinder release valve, for interposition between the control valve and the brake cylinder of a fluid pressure brake controlling system, of the type including a valve housing having therein a control pipe chamber, for connection with the control pipe of the control valve, a brake cylinder chamber, for connection with the brake cylinder, and a vent valve chamber, an exhaust passage, main valve means yieldingly biased to a normal position in which the three chambers are interconnected and isolated from the exhaust passage, and shiftable to a release position in which the control pipe chamber is isolated from the other chambers and the exhaust passage is placed in communication with the brake cylinder chamber and the vent valve chamber, the improvement which comprises:

(a) a secondary vent valve in the exhaust passage;
(b) a first piston means responsive to the control pipe pressure urging the secondary valve open;
(c) a second piston means responsive to brake cylinder pressure urging the secondary vent valve closed, the second means having a larger effective area than the first means;
(d) yieldingly means reacting between said piston means in opposition to the pressures acting thereon;
(e) means limiting movement of the second piston means in the valve closing direction;
(f) means affording communication between the control pipe chamber and the brake cylinder chamber; and
(g) means effective to close that communication when pressure in said control pipe chamber exceeds a predetermined value.

3. The combination defined in claim 2 in which the means effective to close that communication is the first piston means.

No references cited.